United States Patent
Miura et al.

(10) Patent No.: US 7,610,135 B2
(45) Date of Patent: Oct. 27, 2009

(54) APPARATUS FOR TRANSMITTING DATA ACQUIRED FROM BUS-CONNECTED PLURAL ON-VEHICLE SENSORS TO PROCESSING UNIT

(75) Inventors: Hisanori Miura, Gamagoori (JP); Nobuyuki Iwasaki, Nishio (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 550 days.

(21) Appl. No.: 11/064,103

(22) Filed: Feb. 24, 2005

(65) Prior Publication Data
US 2005/0197753 A1     Sep. 8, 2005

(30) Foreign Application Priority Data
Feb. 24, 2004   (JP)   ............... 2004-048544

(51) Int. Cl.
B60R 21/16     (2006.01)
(52) U.S. Cl. ......................... 701/45; 280/735
(58) Field of Classification Search ..................... 701/45
See application file for complete search history.

(56) References Cited
U.S. PATENT DOCUMENTS

| | | | |
|---|---|---|---|
| 3,765,699 A * | 10/1973 | Marquardt et al. .......... 280/735 |
| 5,307,896 A * | 5/1994 | Taguchi et al. ............. 180/274 |
| 5,392,024 A * | 2/1995 | Kiuchi et al. ............... 340/436 |
| 5,673,192 A | 9/1997 | Sato |
| 5,884,203 A * | 3/1999 | Ross .......................... 701/45 |
| 6,147,417 A | 11/2000 | Ueno |
| 6,185,252 B1 * | 2/2001 | Bauer ......................... 375/238 |
| 6,208,924 B1 * | 3/2001 | Bauer ......................... 701/45 |
| 6,438,475 B1 * | 8/2002 | Gioutsos et al. ............. 701/45 |
| 6,696,933 B2 * | 2/2004 | Cooper ........................ 340/438 |
| 6,816,766 B2 * | 11/2004 | Sala et al. .................... 701/45 |
| 6,882,916 B2 * | 4/2005 | Takafuji et al. ............... 701/45 |

(Continued)

FOREIGN PATENT DOCUMENTS

JP        6-276570        9/1994

(Continued)

OTHER PUBLICATIONS

Office Action dated Oct. 23, 2008 in corresponding Japanese patent application No. 2004-048544 (and English translation).

*Primary Examiner*—Thomas G Black
*Assistant Examiner*—Shelley Chen
(74) *Attorney, Agent, or Firm*—Posz Law Group, PLC (57) ABSTRACT

An apparatus is provided for transmitting data in an airbag activation system mounted on a vehicle. The apparatus comprises a communication channel, a plurality of sensor units mutually communicably connected via the communication channel, and a processing unit. Each sensor unit senses a state of the vehicle, produces data indicative of the sensed state of the vehicle into a set of digital data including actually sensed data of a predetermined bit length, the actually sensed data corresponding to the sensed state of the vehicle, and outputs the set of digital data to the communication channel at predetermined transmission intervals. The bit length of the actually sensed data is changed depending on the sensed state of the vehicle. The set of digital data is outputted successively from the sensor modules. The processing unit successively receives the digital data from each sensor unit via the communication channel.

19 Claims, 7 Drawing Sheets

U.S. PATENT DOCUMENTS

| | | | |
|---|---|---|---|
| 7,236,866 B2 * | 6/2007 | Takafuji et al. | 701/45 |
| 2003/0018421 A1 * | 1/2003 | Cooper | 701/45 |
| 2004/0210367 A1 * | 10/2004 | Takafuji et al. | 701/45 |
| 2005/0197753 A1 * | 9/2005 | Miura et al. | 701/45 |

FOREIGN PATENT DOCUMENTS

| | | |
|---|---|---|
| JP | A-H11-245762 | 9/1999 |
| JP | 2000-508861 | 7/2000 |
| JP | 2004-9987 | 1/2004 |

* cited by examiner

APPARATUS FOR TRANSMITTING DATA ACQUIRED FROM BUS-CONNECTED PLURAL ON-VEHICLE SENSORS TO PROCESSING UNIT

CROSS REFERENCES TO RELATED APPLICATIONS

The present application relates to and incorporates by reference Japanese Patent application No. 2004-48544 filed on Feb. 24, 2004.

BACKGROUND OF THE INVENTION

1. Technical Field of the Invention

The present invention relates to an apparatus for transmitting, to a processing unit, data acquired from a plurality of on-vehicle sensor modules (or sensor units) mutually connected by a bus that also connects to the processing unit. Particularly, the present invention relates to an apparatus provided with a plurality of on-vehicle sensor units incorporated in an airbag activation system mounted on a vehicle and configured to detect levels of a collision load in the digital format and a processing unit connected to the sensor modules via a common communication bus that carries the digital data provided by the sensor modules to the processing unit for desired processing thereof.

2. Description of the Related Art

In a conventional airbag activation system, a plurality of sensor modules (sensor units) are used and individually disposed at each part of a vehicle. A signal outputted from each sensor module is converted into digital data of a predetermined format by a communication unit (communication IC) embedded in each sensor module, and is then provided to an electronic control apparatus for airbags (central airbag ECU) by way of buses. This data transmission is called "bus-connected type of sensor data transmission technique," which is good in simplifying the constructions of a communication system and facilitating system changes. When using this bus-connected type of sensor data transmission technique, transmitting the digital data from each sensor module to the central airbag ECU on a serial signal format is the most suitable for simplifying the communication unit.

As described in the Japanese Patent Laid-open publication No. 06-276570, this bus-connected type of sensor data transmission technique has been well known for an on-vehicle sensor data transmission apparatus as well as a data transmission system dedicated for the airbag activation systems described in the above.

However, a bus transmission band of the bus-connected type of sensor data transmission technique is obliged to be narrow because of, for example, limitations from radiant electromagnetic wave noises. Therefore, the number of sensors that can e connected to one serial bus, the bit length of data that can be given to each sensor module, and a frequency of data output are subjected to strong limitations. For example, the digital data outputted from each sensor module is composed of 4-bit address bits indicating an address of the sensor module, 8-bit data bits following the address bits, and 4-bit error correction bits (or error detection bits for correcting an error) that follow data bits. That is, the digital data is formatted to have 16 bits in total.

In order to reply to a request that radiant electromagnetic wave noises should be lower, the serial bus is usually designed to have a bit rate of 150 kbps or less. Meanwhile, there is a further demand that it is favorable to examine digital data outputted in an airbag activation system at intervals of 500 µs or less, because of keeping an admissible delay for detecting collisions caused between vehicles. This means that the number of sensor modules that can be connected to a single serial bus is limited in the airbag activation system. In addition, it is favorable to keep the bit rate lower in improving noise resistant characteristics and in saving power consumption.

However, in the above airbag activation system and various types of on-vehicle sensor data transmission apparatuses employing the bus-connected type of sensor data transmission method, there has surely been a demand for making it possible that a growing number of sensor modules are connected to the bus. There has also been the demand that the bit length of digital data from each sensor be made greater to ensure higher accuracy thereof.

SUMMARY OF THE INVENTION

In light of the above-mentioned circumstances, an object of the present invention is to provide an apparatus for transmitting data from on-vehicle sensors incorporated in an airbag activation system mounted on a vehicle, which is able to improve accuracy data to be transmitted and increase the number of sensor modules to be connected to a communication bus in the apparatus, without increasing the bit rate of the bus, that is, without expanding the band of the bus.

In order to achieve the object, as one aspect, the present invention provides an apparatus for transmitting data in an airbag activation system mounted on a vehicle, the apparatus comprising a communication channel having a predetermined transmission band for digital data; a plurality of sensor units mutually communicably connected via the communication channel; and a processing unit. Each sensor unit senses a state of the vehicle, produces data indicative of the sensed state of the vehicle into a set of digital data including actually sensed data of a predetermined bit length, the actually sensed data corresponding to the sensed state of the vehicle, and outputs the set of digital data to the communication channel at predetermined transmission intervals, either the bit length of the actually sensed data or a frequency of transmission of the digital data being changed depending on the sensed state of the vehicle and the set of digital data being outputted successively from the sensor modules. The processing unit successively receiving the digital data from each sensor unit via the communication channel.

That is, in the present invention, an electrical quantity corresponding to a state quantity, which is a detected physical or chemical quantity, changes the number of data bits or the frequency of the transmission in response to changes in the state quantity, Therefore, in transmitting the data coming from the sensor units, amounts of data to be transmitted can be increased and decreased with taking the state quantity into account. Thus, without causing a shortage of the amounts of data to be transmitted from the sensor units, the amounts of data to be transmitted can be cut back. This data saving will lead to a reduction in the power consumption at each sensor unit. Concurrently, it makes it possible that amounts of data to be transmitted from other sensor units can be increased.

Preferably, each of the sensor units is provided with a sensor sensing, as the state of the vehicle, an impact load to be applied to the vehicle.

A collision load (collision weight) inputted into the collision load detection sensor, which is employed for activating the airbag apparatus for vehicles, is small in amplitude in the normal running conditions. But this is not true of a condition in which a collision occurs. In the normal running conditions, the data can be transmitted in bits of small bit lengths. In contrast, when a collision occurs, it is absolutely necessary to detect the strength of the collision with precision. For achieving this, the collision strength should be detected at higher frequencies for more detailed information.

Therefore, by making use of the present invention, amounts of data to be transmitted from sensor units that have not sensed a collision can be lessened, while such amounts can be raised when detecting a collision.

It is preferred that each of the sensor units is configured to produce information representing an increase in the bit length of the actually sensed data or an increase in the transmission frequency in cases where the sensed impact load has a large amplitude involving changes in predetermined high bits of the actually sensed data and information representing a decrease in the bit length of the actually sensed data or a decrease in the transmission frequency in cases where the sensed impact load has a small amplitude involving no changes in predetermined high bits of the actually sensed data. Through the above manner, negative effects which would be caused by decreasing the number of bits can be avoided.

Preferably, each sensor unit is configured to transmit a signal including information indicative of either the sensed state of the vehicle or the bit length to be changed of the digital data to be transmitted to the processing unit and the processing unit is configured to use the signal to determine either the sensed state of the vehicle or the bit length to be changed of the digital data, to decide a transmission state for the digital data to be received next, on the basis of a determined result, and to command that each sensor unit transmits the set of digital data based on the decided transmission state. With the above procedures, the processing unit can detect the changes in the number of bits conducted by the sensor unit without fail. Then, the processing unit can respond to the changes well.

It is also preferred that the transmission state includes a mode on which each set of digital data is transmitted, the mode defining a format of each set of digital data, the format including data bits indicating the actually sensed state of the vehicle, and the data bits having either the predetermined bit length or half the predetermined bit length. Through the above, when the processing unit receives the changes in the number of bits from the sensor unit, the processing unit is able to output a command to the other sensor units so that the other sensor units respond to the 5 changes well. Therefore, the transmission is prevented from being beyond the limitation and/or being not reliable.

By way of example, the processing unit is configured to change the number of sensor units selected among the sensor units, the selected sensor units transmitting the set of digital data to the communication channel, and the bit length of the set of digital data, under the condition that a bit rate of the communication channel is within a given threshold, the bit rate being defined by the transmission band. As a result, detailed data can be obtained from necessary sensor units frequently, while still suppressing electromagnetic noise and power consumption.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but is for the purpose of explanation and understanding only.

In the accompanying drawings:

FIG. 6 is a flowchart outlining the control of both the 8-bit and 4-bit data transmission modes; and FIG, 7 is a further circuit block diagram which also partially shows the inner configuration of a sensor module and a central airbag ECU incorporated in the airbag activation system.

DETAILED DESCRIPTION OF THE PREFERRED EMBODIMENTS

Referring to the accompanying drawings, various preferred embodiments of a data transmission apparatus for on-vehicle sensors, to which the present invention is applied, will now be explained. Though such various embodiments will be listed as bellow, the present invention is not limited to the listed embodiments, but other various known arts are also applied to the listed embodiments in a combined or further modified manner.

First Embodiment

Referring to FIGS. 1-6, a first embodiment of the data transmission apparatus for on-vehicle sensors will now described.

Figure 1:
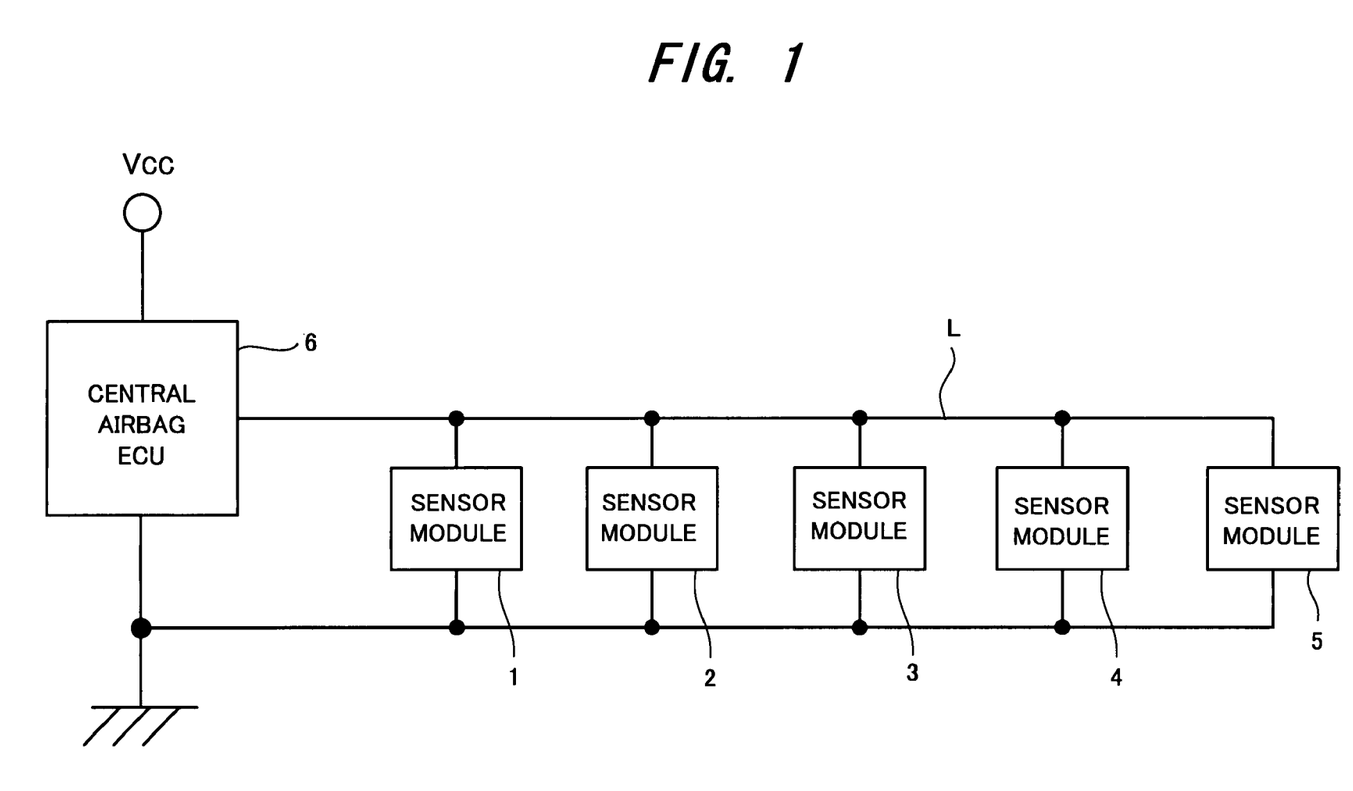
FIG. 1 is a circuit block diagram showing a connection among sensor modules of an airbag activation system employed in a first embodiment according to the present invention.

FIG. 1 outlines the configuration of an airbag activation system mounted on a vehicle, to which the data transmission apparatus according to the present invention is applied, which is drawn to show a connection among a plurality of sensor modules (i.e., senor units according to the present invention) incorporated in the airbag activation system.

The airbag activation system shown in FIG. 1 is provided with a plurality of sensor modules 1-5 and a central airbag ECU (Electrical Control Unit) 6. Such plural sensor modules 1-5 are arranged at predetermined individual portions of a vehicle for detecting a collision with other vehicles. The central airbag ECU 6 composes a processing unit of the present invention, which is in charge of processing of data acquired from the sensor modules 1-5. The data processing includes processing for activating airbags on the vehicle. The sensor modules 1 to 5 are electrically connected to the central airbag ECU 6 via a single serial bus L which serves as a communication channel.

Figure 2:
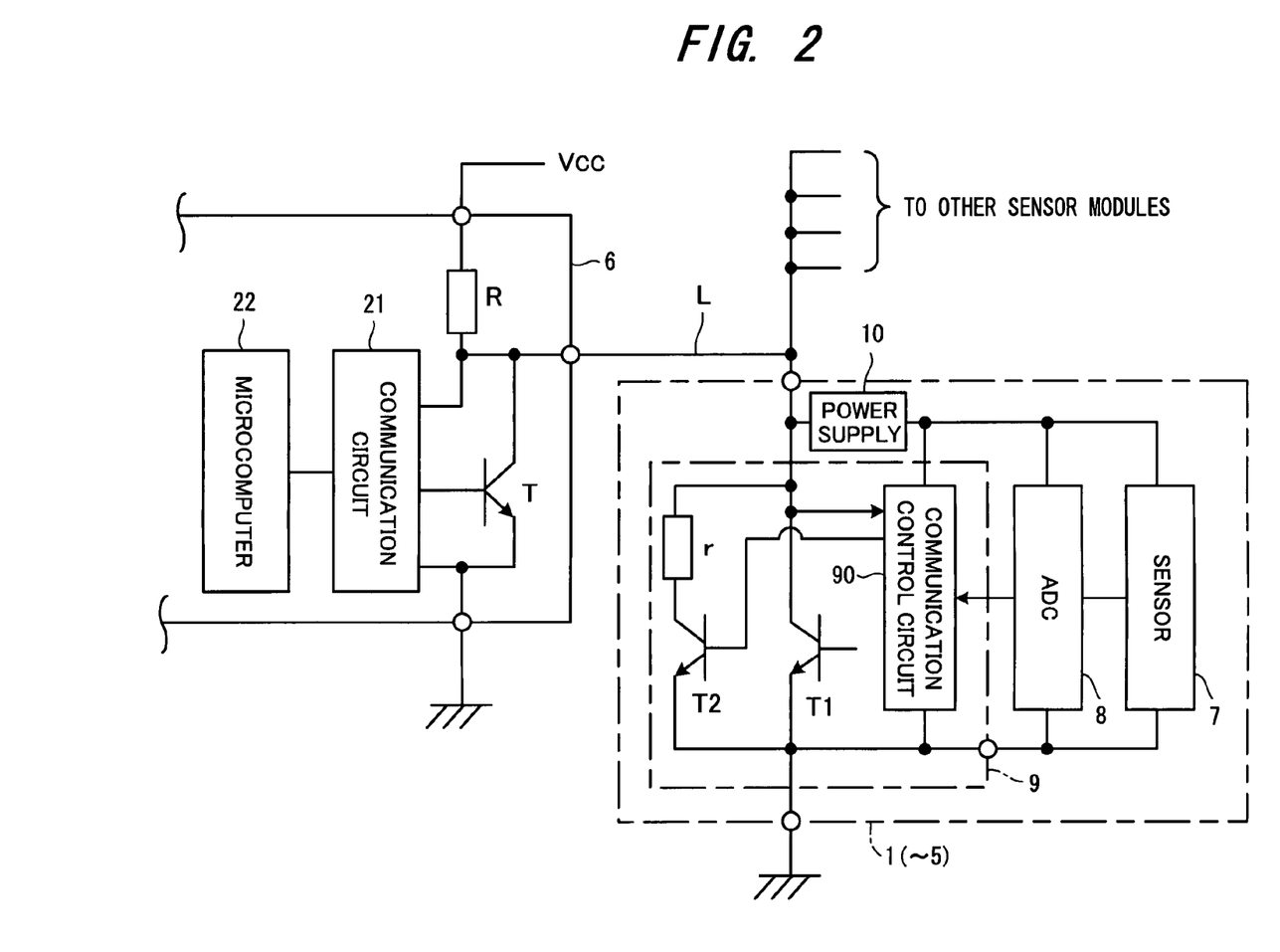
FIG. 2 is a circuit block diagrams partially showing the inner configuration of a sensor module and a central airbag ECU incorporated in the airbag activation system.

The electrical configuration of each of the sensor modules 1-5 is shown in FIG. 2. Each of the sensor modules 1 to 5 is provided with a sensor 7, a 8-bit A/D (analog to digital) converter 8, a communication circuit 9, and a power supply circuit 10 powering each senor 1 (to 5). Of these constituents, the sensor 7 is formed into an acceleration sensor that senses a collision with other vehicles to output an analog voltage signal depending on the amplitude of a collision load level. The 8-bit A/D converter 8 converts voltage of the analog voltage signal from the sensor 7 into a digital format thereof. The communication circuit 9 is responsible for converting the digital voltage signal from the A/D converter 8 into digital data with a predetermined format before providing the digital data to the serial bus L. The communication circuit 9 has a communication control circuit 90 which is in charge of the foregoing conversion of the digital voltage signal from the A/D converter 8 to the digital data of the predetermined format and the provision of the converted data at intervals.

The A/D converter 8 is formed into a 8-bit converter in this embodiment, so that a collision load level can be detected at 256 steps with the A/D converter 8. A least significant bit of 8-bit data, which is provided to the serial bus L at the beginning or at the last of the 8-bit data, is used as a sign bit showing a direction along which the collision load has been caused.

The power supply circuit 10 supplies electric power to the acceleration sensor 7, A/D converter 8, and communication control circuit 90 by generating an internal power voltage using voltage supplied through the serial bus L. The power supply circuit 10 is electrically connected to the serial bus L through a diode (not shown) for preventing a reverse current when the voltage on the serial bus L becomes low. In addition, the power supply circuit 10 has a smoothing circuit (not shown) for smoothing current ripples, but such a configuration has been known well, with the details thereof omitted here.

The communication circuit 9 additionally includes transistors T1 and T2, which are placed as open-collector types of transistors. The collectors of the transistors T1 and T2 are electrically connected to the serial bus L directly and through a resistor r, respectively. The communication control circuit 90 is able to provide data to the central airbag ECU 60 by driving the transistors T1 and T2. The communication control circuit 90 also receives information indicating a mode command from the central airbag ECU through the serial bus L, and then decides the format of digital data to be transmitted under the commanded mode at the next timing.

Although not shown in detail, the central airbag ECU 6 includes a communication circuit 21 communicating with the serial bus L and a microcomputer 22 (including a CPU and memories) for processing digital data received from each of the sensor modules 1 to 5 through the communication circuit 21. This central airbag ECU 6 is also provided with a transistor T for outputting a mode command to each of the sensor modules 1 to 5 through the serial bus L and a resistor R for supply of electric power to each of the sensor modules 1 to 5 through the serial bus L. This resistor L also functions as collector loads for the transistor T1, transistor T2 and transistor T.

Figure 3:
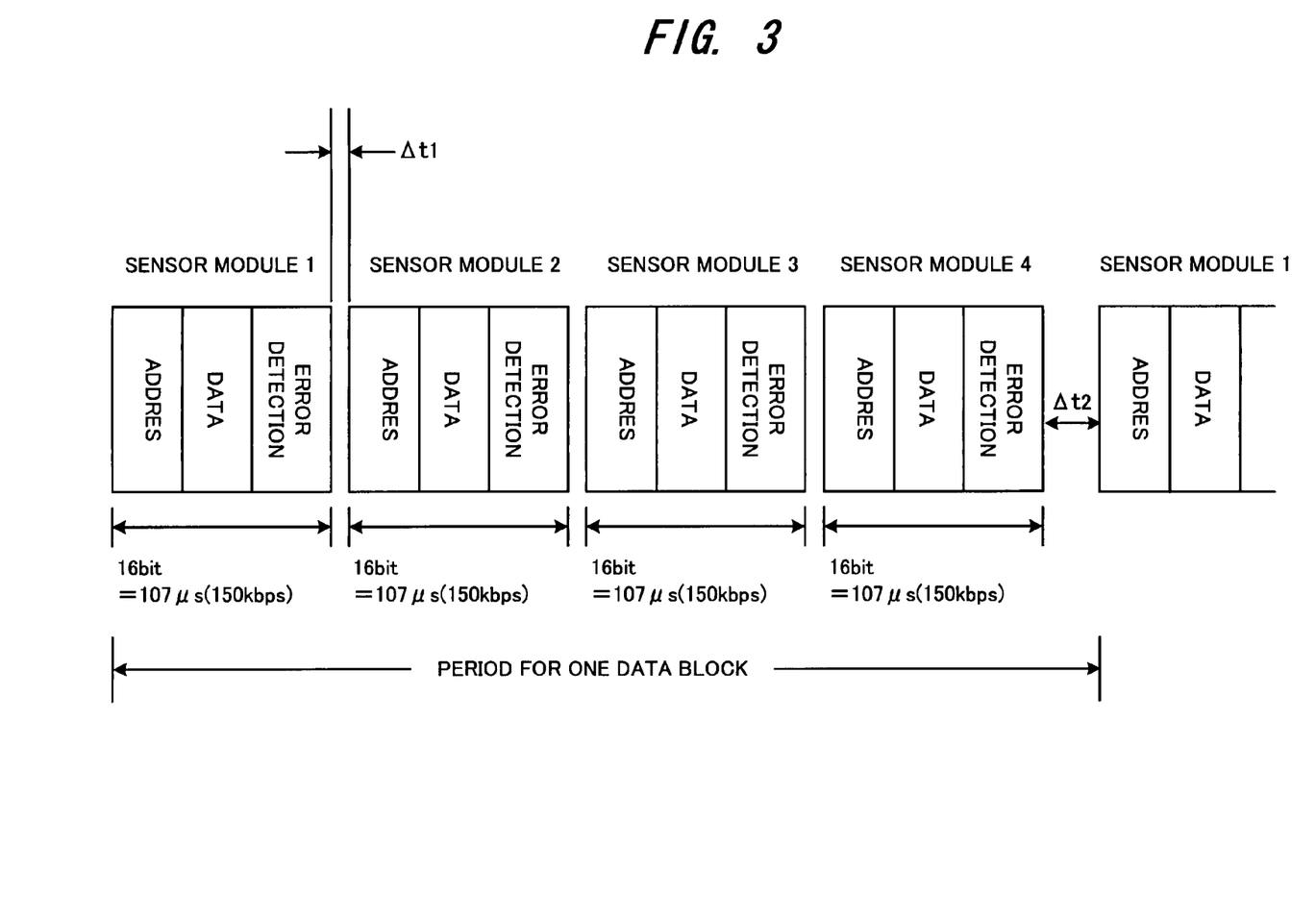
FIG. 3 is a data allocation view showing the format of a 8-bits data transmission mode.
Figure 4:
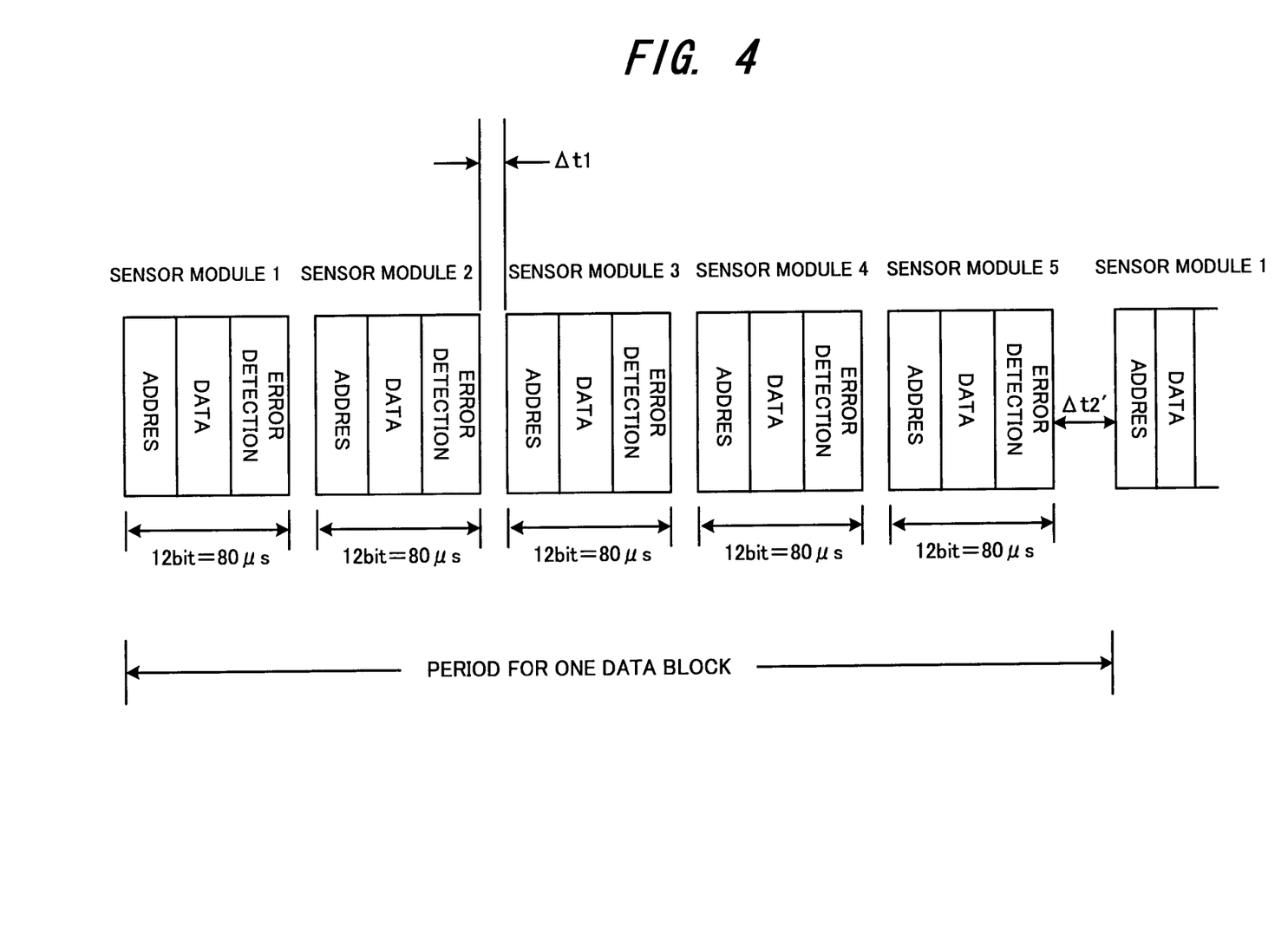
FIG. 4 is a data allocation view showing the format of a 4-bits data transmission mode.

Each of the sensor modules 1 to 5 has the capability of outputting data on the foregoing format which is either a 8-bit data transmission mode or a 4-bit data transmission mode, both of which are prepared beforehand. The 8-bit data transmission mode has a format which is, as shown in FIG. 3, composed of 4 bits assigned to an address (address bits), 8 bits assigned to data (data bits) which follows the address bits, and 4 bits assigned to error detection bit (or error correction) (error detection bits or error correction bits) which follows the data bits. On the other hand, the 4-bit data transmission mode has a format which is, as shown in FIG. 4, composed of 4 bits assigned to an address (address bits), 4 bits assigned to data (data bits) coming next to the address bits, and 4 bits assigned to error detection or error correction (error detection bits or error correction bits) coming next to the data bits.

At first the 8-bit data transmission mode will now be explained.

FIG. 3 shows a data flow which shows a serial transmission of data of a 8-bit length, which is carried out sequentially in time when four sensor modules 1 to 4 selected out of all the sensor modules 1 to 5 are in operation in the 8-bit data transmission mode. This transmission has a bit rate of 150 kbs and a pulse period of about 7 μs. The sensor modules 1 to 4 are designed to output digital data in order of the sensor modules 1, 2, 3, 4, 1, etc. Thus, the total bit length (i.e., amount) of digital data provided by each of the sensor modules 1 to 4 within one cycle becomes 16 bits, so that a period of time of 107 μs is required as a transmission time for transmitting the 16 bits of digital data. Hence a period of time required for transmitting all the digital data (also referred to as "data block") from all the sensor modules 1 to 4 through one cycle is 428 μs at the minimum. As a result, if all data digital are transmitted one time from all the sensor modules 1 to 4 at intervals of 500 μs, a period of 72 μs will be left unoccupied in principle.

In the present embodiment, a predetermined unoccupied time $\Delta t1$ is inserted between adjacent sets of 16-bit digital data, which occupies part of the data block of 64 bits outputted from the four sensors 1 to 4. Further, a predetermined unoccupied time $\Delta t2$ is also inserted between adjacent data blocks. Thus, a period of time of $3\Delta t1+\Delta t2$ is set to be equal to 72 μs. In the present embodiment, the most significant bit of the 4-bit address is always set to "1" to show a starting pulse of each set of digital data from each of the sensor modules 1 to 4.

The 4-bit data transmission mode will then be described. A data flow shown in FIG. 4 shows the transmission of digital data from all the sensor modules 1 to 5 in operation in the 4-bit data transmission mode, in which data of a 4-bit length is transmitted serially in time. This transmission has a bit rate of 150 kbs and a pulse period of about 7 μs. The sensor modules 1 to 5 are designed to output digital data in the order of the sensor modules 1, 2, 3, 4, 5, 1, etc. Thus, the total bit length (i.e., amount) of digital data provided by each of the sensor modules 1 to 5 within one cycle becomes 12 bits, so that a period of time of 80 μs is required as a transmission time for transmitting the 12 bits of digital data. Hence a period of time required for transmitting all the digital data (also referred to as "data block") from all the sensor modules 1 to 5 through one cycle is 400 μs at the minimum. As a result, if all data digital are transmitted one time from all the sensor modules 1 to 5 at intervals of 500 μs, a period of 100 μs will be left unoccupied in principle.

In the present embodiment, a predetermined unoccupied time $\Delta t1$ is inserted between adjacent sets of 12-bit digital data, which occupies part of the data block of 60 bits outputted from the four sensors 1 to 5. Further, a predetermined unoccupied time $\Delta t2'$ is also inserted between adjacent data blocks. Thus, a period of time of $4\Delta t1+\Delta t2'$ is set to be equal to 100 μs. In the present embodiment, the most significant bit of the 4-bit address is always set to "1" to show a starting pulse of each set of digital data from each of the sensor modules 1 to 5.

Figure 5A:
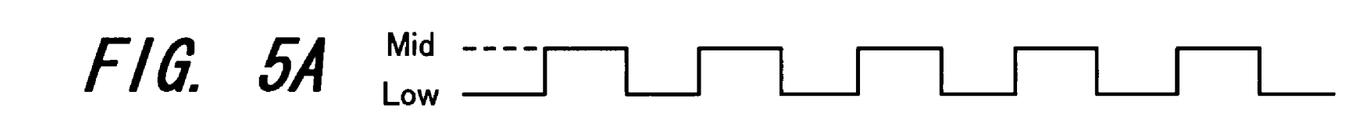
FIGS. 5A and 5B are timing charts each showing voltage pulses of which amplitudes indicate that each sensor module senses data of a high value or data of a low value.
Figure 5B:
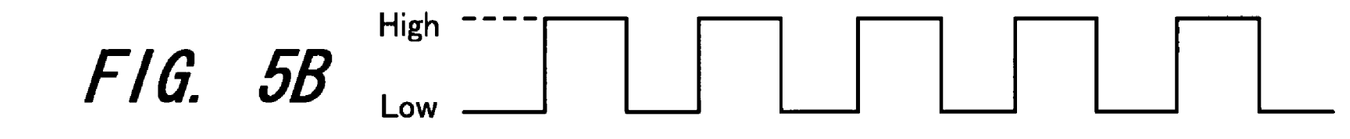

FIGS. 5A and 5B show pulsed voltage waveforms which are transmitted by each of the sensor modules 1 to 5, respectively. The pulse waveforms shown in FIG. 5B are used by each transducer module 1 (to 5) when the sensor module transmits to the central airbag ECU 6 digital data corresponding to a high collision load level (i.e., an incompressive transmission with no compression of data). In contrast, the pulse waveforms shown in FIG. 5A are used by each transducer module 1 (to 5) when the sensor module transmits to the central airbag ECU 6 digital data corresponding to a small collision load level (i.e., a compressive transmission). Such pulse waveforms are created by switching the transistors T1 and T2 in an appropriate manner.

A bit level of 1 (i.e., High) in the incompressive transmission is assigned to a voltage of 0 V, while a bit level of 0 (i.e., Low) is assigned to a voltage of 12 V. Practically, each of the sensor modules 1 to 5 generates data to be outputted by switching on/off the transistor T1 shown in FIG. 2, so that the voltage waveforms shown in FIGS. 5A and 5B can be produced. A power-supply voltage Vcc is set to 12 V, with the result that when the transistor T1 is switched on, a voltage on the serial bus L is reduced to substantially zero, whilst when being switched off, the voltage becomes 12 V.

Further, a bit level of 1 (i.e., Mid.) in the compressive transmission is assigned to a voltage of 6 V, while a bit level of 0 (i.e., Low) is assigned to a voltage of 12 V. Practically, each of the sensor modules 1 to 5 generates data to be outputted by switching on/off the transistor T2 shown in FIG. 2, so that the voltage waveforms shown in FIG. 5A can be produced. A power-supply voltage Vcc is set to 12 V and the resistors r and R are equal in their resistance values to each other, with the result that when the transistor T2 is switched on, a voltage on the serial bus L is reduced to 6 V, whilst when being switched off, the voltage becomes 12 V.

How to control data to be transmitted from each of the sensor modules 1 to 5 to the central airbag ECU 6 will now be described.

The sensor modules 1 to 5 each includes load sensors for detecting a collision with other vehicles or subjects. Hence, in the normal conditions which do not associate such collisions, each sensor module senses only a load of an extremely low or substantially zero level.

In the present embodiment, the circuit design is made such that digital data indicative of a load of an extremely low or substantially zero level, which are detected by each sensor module in the normal conditions, are transmitted in the 4-bit data transmission mode. However, when at least one of the sensor modules 1 to 5 detects a collision load of a high level, the sensor module(s) operates to transmit digital data indicative of the collision load to the central airbag ECU 6.

In response to the reception of the digital data, the central airbag ECU 6 uses the information the received data contains, in order to decide which transmission mode (i.e., which data format) should be used next time. The sensor modes 1 to 5 are then notified of the decided transmission mode, respectively. The notified transmission mode is used in the next transmission of a data block such that only four of the sensor modules 1-5, which includes one or more sensor modules which have detected high load levels, are shifted to data transmission based on the 8-bit data transmission mode.

Thereinafter, the control of transmission protocols and data transmission mode (i.e., data format) will now be detailed.

Figure 6:
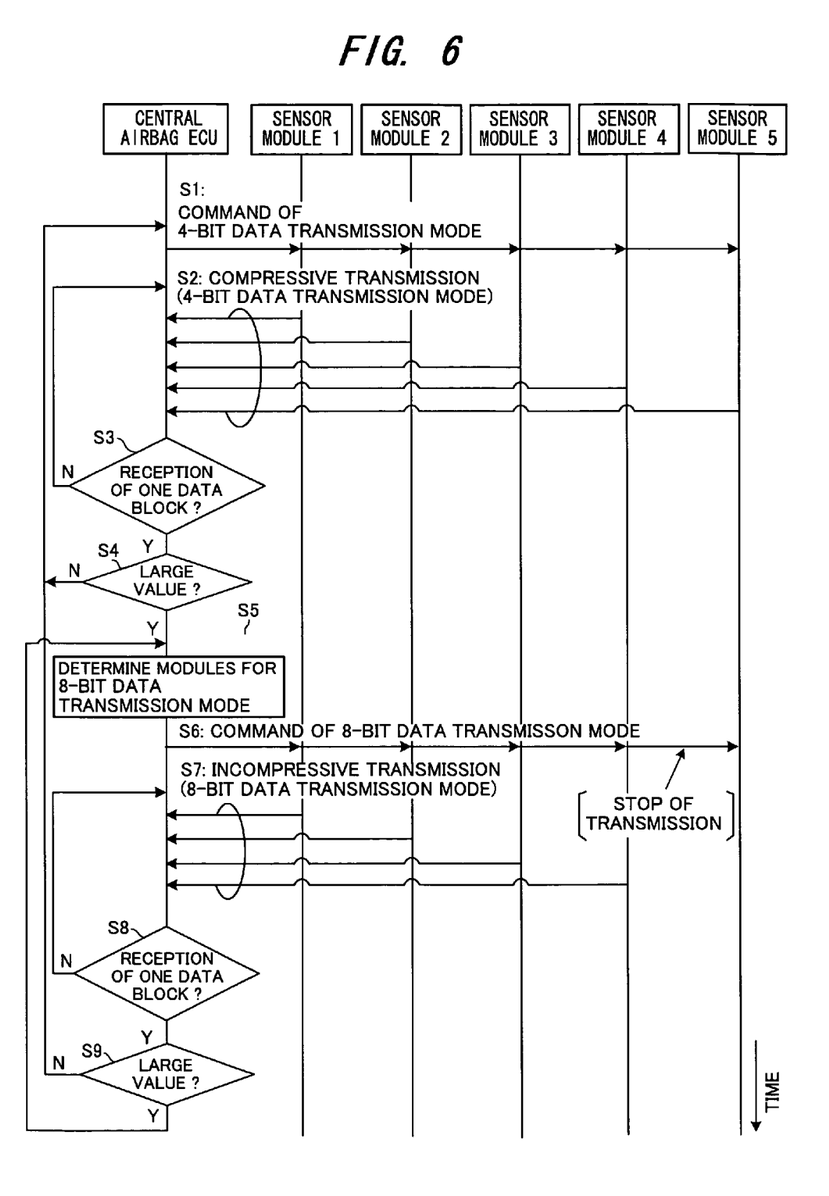

At first, when the central airbag ECU 6 is activated in response to reception of the power-supply voltage Vcc, the central airbag ECU 6 will issue a transmission command on, as the initial one, the 4-bit data transmission mode toward the serial bus L (step S1 in FIG. 6). This command for the 4-bit data transmission mode is specified by a pattern of bits indicated by plural pulsed signals whose pulse widths are made longer than the widths of the pulses used for transmitting digital data from the sensor modules 1-5 to the central airbag ECU 6.

In cases where each of the sensor modules 1 to 5 receives the transmission command on the 4-bit data transmission mode, each sensor module conducts the compressive transmission under the 4-bit data transmission mode at a time instant which is delayed respectively from the reception of the transmission command (step S2). The delay times assigned to the respective sensor modules 1 to 5 are differentiated from one another. That is, digital data including 4-bit data are transmitted from each sensor module to the serial bus L at intervals. This data of a 4-bit length consists of low 3 bits and the least significant bit selected from 8-bit data outputted by the A/D converter 8, with high 4 bits omitted from the output from A/D converter 8. The low 3-bit data indicate a low load level to be detected by each sensor in the normal conditions with no collisions occurring. This data transmission under the 4-bit data transmission mode is carried out with signals pulsated between the voltages of 6 and 12 V, as described in FIG. 5A, which are produced by the transistor T2 which is put in its switching-on/off operations.

The center airbag ECU 6 waits for a certain period of time, during which the ECU 6 determines whether or not all the sensor modules 1 to 5 have transmitted their digital data one time by turns (step S3). Responsively to the determination that a set of data block have been come from the sensor modules 1 to 5, the central airbag ECU 6 proceeds to the next step, at which the determination whether or not there are no data showing a large value corresponding to a high load level is made (step S4). If there is no such data showing the large value, the central airbag ECU 6 returns its processing to step S1 to repeat the above procedures. That is, when the levels indicated by the digital data from all the sensor modules 1 to 5 are still smaller than a predetermined value corresponding to the lower 3 bits of the 8 bits assigned to the A/D converter 8, the 4-bit data transmission mode will be commanded to the sensor modules 1 to 5 again.

However, during such repetitions of the command control, the communication control circuit 90 may receives digital data showing a high load level, for example, which is larger than a predetermined threshold, from the A/D converter 8 in a certain one of the sensor modules 1 to 5. Such a case will happen when a collision with other vehicles or substances is caused. When such a case is caused, a period of time assigned to the next self transmission in the 4-bit data transmission mode is used such that the communication control circuit 90 forcibly switches the transistor T1 on/off based on the 8-bit data transmission mode involving both the 0 and 12 volts, resulting in that the self digital data in the 8-bit data transmission mode is provided to the serial bus L.

Hence, the central airbag ECU 6 recognizes that part or all of the sensor modules 1 to 5 have sensed high levels of load applied thereto. The ECU6 then determines the address(es) of a sensor module 1 (to 5) that has sensed such a high load level (step S5), and then, for the next transmission, transmits a command showing the 8-bit data transmission mode to, for example, four modules 1 to 4 selected from the sensor modules 1 to 5 during an unoccupied period of time which comes after receiving the data block (step 6). This command for the 8-bit data transmission mode is specified by a pattern of bits indicated by plural pulsed signals whose pulse widths are made longer than the widths of the pulses used for transmitting digital data from the sensor modules 1-5 to the central airbag ECU 6.

That is, using this command, the central airbag ECU 6 specifies the addresses of one or more sensor modules 1 (to 4) which should be removed from the next transmission based on the 8-bit data transmission mode.

Accordingly, the data transmission from the selected sensor modules 1 to 4 to the central airbag ECU 6 is carried out by turns at intervals (step 7). Then the same procedures as steps S3 and S4 are performed to repeat the foregoing processing (steps S8 and S9).

In cases where all the sensor modules 1 to 5 have sensed high load levels, that is, digital data on the 8-bit data transmission mode have come from all the sensor modules 1 to 5, it is favorable that the central airbag ECU 6 specifies a predetermined sensor module to be removed from the data transmission. This removal is specified by an address specifying pulse signal also having a long pulse width, which follows the foregoing pulsed command having a long pulse width on the 8-bit data transmission mode. In the specification processing to remove one or more sensor modules from the data transmission, a sensor module that provides digital data indicative of a high load level will not be omitted, so far forth, from the sensor modules in charge of data transmission. Preferably, a sensor module that outputs digital data showing the lowest load level should be removed from a group of sensor modules in charge of data transmission.

An alternative manner is to automatically remove a sensor module to which a lowest priority has been given in advance. In such a manner, it is not necessary for the central airbag ECU 6 to specify addresses of sensor modules to be removed, to sensor modules 1 to 5. In consequence, of all the sensor modules 1 to 5, a predetermined sensor module of the lowest priority automatically stops the next transmission of digital data even when the module receives the above pulse signal indicating the 8-bit data transmission mode from the serial bus L.

Accordingly, it is possible to receive digital data of a short bit length from a multiplicity of sensor modules under the normal conditions, while it is still possible to receive, when colliding with a vehicle or others, digital data of a long bit length from senor modules which are less in number than that in the normal conditions, such sensor modules still including the sensor module that has sensed the collision.

The foregoing embodiment can still be modified into a various types of forms, which will now be described.

A first modification relates to how to notify the central airbag ECU 6 of whether each sensor module has sensed a large load weight or a low load weight. In the foregoing first embodiment, the two types of pulse signals which have different pulse amplitudes as shown in FIGS. 5A and 5B are used for the above notification. Instead, whenever each sensor module detects a large load weight, the sensor module may turn on the transistor T2 continuously at least for a period of time during which digital data corresponding to the large load weight is outputted from the sensor module. When such a configuration is employed, the resistor r is made to have a resistance value very larger than that of the resistor R. Accordingly, turning on the transistor T2 will produce a drop in the voltage across the resistor R in the central airbag ECU 6. Thus the ECU 6 is able to detect this voltage drop to recognize that there is a sensor module that has sensed a large load weight. This recognition leads to commanding the 8-bit data transmission mode for the next transmission of a data block.

A second modification relates to how to transmit digital data from each sensor module to the central airbag ECU 6.

In the foregoing embodiment, each of the sensor modules 1 to 5 selectively uses, every data block, both the 4-bit data transmission mode and the 8-bit data transmission mode. As described, the 4-bit data transmission mode is used all the sensor modules 1 to 5 for transmitting digital data of a small load weight, while the 8-bit data transmission mode is used by some sensor modules 1 to 4, with one or more sensor modules 5 omitted from the transmission group, for transmitting digital data of a large load weight.

This transmission manner can be replaced by a mixed group of sensor modules 1 to 5 in which some sensor modules (e.g., 1 to 3) operating on the 4-bit data transmission mode and other sensor modules (e.g., 4 and 5) operating on the 8-bit data transmission mode. In other words, this mixing configuration allows digital data of the 4-bit length and digital data of 8-bit length to be allocated mixedly in one data block to be transmitted per one cycle. More specifically, one data block is composed of 8-bit digital data occupying part of the data block and 4-bit digital data occupying the remaining of the data block.

However, if the five sets of digital data from the sensor modules 1 to 5 are 8-bit data, the period of time necessary for one data block goes beyond a limitation. To avoid such a situation, the design should be made to limit the number of sets of 8-bit digital data to two at most. When this mixing technique is employed, it is necessary to specify which sensor module(s) to transmit their digital data in the 8-bit data transmission mode, This specification can be done by the use of the address commands from the central airbag ECU 6. When it is recognized that the number of senor modules that have sensed high load weights is two or less, the ECU 6 commands the as-recognized sensor modules of the 8-bit data transmission. In contrast, if the number of such sensor modules is three or more, the central airbag ECU 6 gives commands for the 8-bit data transmission to one sensor module selected from the three or more sensor modules using a predetermined priority, An alternative is that one or more ones selected from the three or more sensor modules are prohibited from the transmission itself and the remaining one or more sensor modules are entitled to the 8-bit data transmission.

A third modification is to use a 10-bit data transmission mode in which digital data is transmitted in a 10-bit length, in place of the foregoing 8-bit data transmission mode.

A fourth modification concerns with specifying the data bit length. In the foregoing embodiment, the pulse voltage waveforms are changed in their amplitudes, as shown in FIGS. 5A and 5B, to transmit digital data under a specified data bit length (i.e., a specified transmission mode) and the changed amplitude is associated with a row of all the digital data. Alternatively, it is not always necessary to associate the changed amplitude with all the digital data, but other modes are also available in this respect. That is, changing the voltage amplitudes can be associated with only part of the row of all the digital data. For example, the pulsed voltage amplitudes may be changed only during the transmission of the address bits or only the transmission of digital data bits. Alternatively, the transistor T2 may be turned on continuously during the transmission of all digital data in the 8-bit data transmission mode.

Further, a fifth embodiment will now be described, which uses a particular one bit to specify the data bit length. This one bit is added to the last of the foregoing address bits. By employing this, the total bit length of all the digital data outputted from each sensor module is always longer by one bit than the before. Though it should be patient about the longer bits, this drawback can be overcome by the advantages derived from changing the data bit length and the additional one bit to specifying the bit length is still advantageous in that the data bit length is easy to specify.

Second Embodiment

Figure 7:
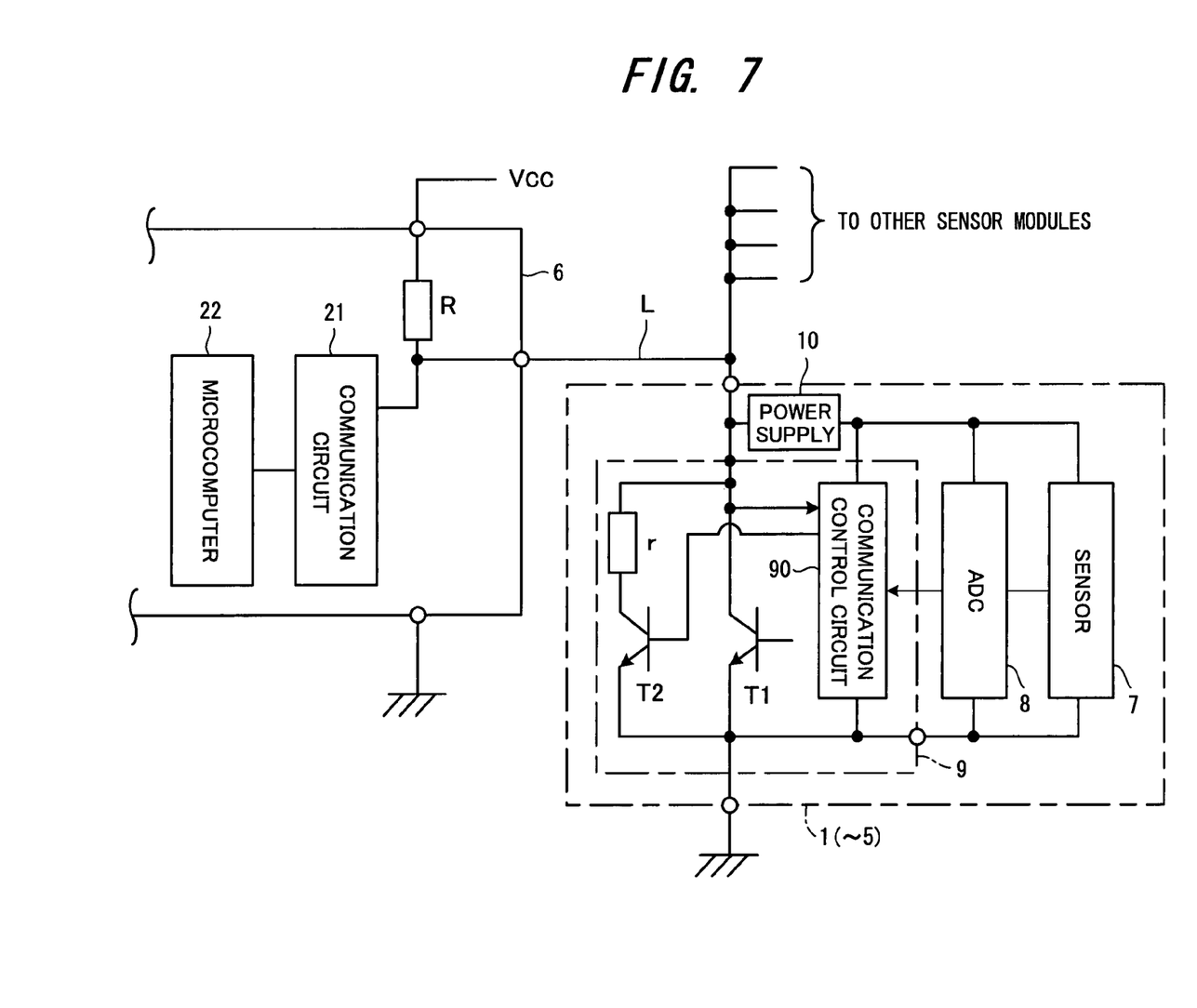

Referring to FIG. 7, a second embodiment of the present invention will now be described. In the second embodiment, the similar or identical components to those in the first embodiment will be given the same reference numerals for the sake of simplified explanations. This manner is also true of a third embodiment to be detailed later The second embodiment also concerns with an airbag activation system mounted on a vehicle, to which the data transmission apparatus according to the present invention is applied. The airbag activation system is configured in the same way as the above shown in FIGS. 1 and 7, in which there are provided with the central airbag ECU 6 and the sensor modules 1 to 5 connected to the common serial bus (communication line) L. However the configuration shown in FIG. 7 differs from that in FIG. 2 in that the transistor T for commanding the transmission modes is omitted from the central airbag ECU 6.

In this embodiment, each of the sensor modules 1 to 5 detects digital data from other sensor modules on the serial bus L, and outputs the digital data of its own to the serial bus L at a predetermined timing based on the detected results.

Like the first embodiment, each of the sensor modules 1 to 5 outputs 4-bit digital data by turns, so that, as a whole, each block data is outputted at intervals of 500 µs or less, in cases where load levels sensed by all the sensor modules 1 to 5 are lower than a predetermined threshold. When some of all the sensor modules 1 to 5 outputs digital data corresponding to high load levels, each of the sensor modules 1 to 4 other than the sensor module 5 or each of four sensor modules arbitrarily selected form the sensor modules 1 to 5 engages in one-time output of 8-bit digital data by turns so that one block data is outputted at intervals of 500 µs or less. Alternatively, with the intervals of 500 µs or less maintained, each data block consisting of 4-bit digital data and 8- to 10-bit digital data, which are combined with each other, is outputted sequentially in time.

In the present embodiment, in order to control the above data output, when one of the sensor modules 1 to 5 senses a high load level, the data transmission is conducted with the transistor T1 switched on/off (the data transmission involving the large voltage pulse amplitudes shown in FIG. 5B). Meanwhile when sensing a low load level, the data transmission is conducted with the transistor T2 switched on/off (the data transmission involving the small voltage pulse amplitudes shown in FIG. 5A).

This manner allows the central airbag ECU 6 and the other sensor modules to know that the currently sensed load level is high or low. Thus the ECU 6 is able to detect the amplitude of the digital data which is now under the reception and to recognize the bit length thereof. Concurrently, the communication control circuits 90 in the other sensor modules are able to know the bit length of the digital data which is currently on the serial bus L. Thus the communication control circuits 90 are allowed to predict the end timing of the data transmission now on the serial bus L, so that the circuit 90 of a sensor module of the next ranking follows the end timing to transmit its digital data succeedingly.

However, it is necessary to allow a predetermined one sensor module to voluntarily transmit its digital data immediacy after supply of the power-supply voltage. Moreover, if it is found out that the total time of transmission of the last four sets of digital data outputted on the serial bus L reaches a predetermined threshold, the next sensor module is temporarily prohibited from transmitting its digital data, before the predetermined sensor module 1 starts transmitting its digital data.

With the above configurations and procedures, without any control of the transmission from the central airbag ECU 6, the communication control circuit 90 of each sensor module is able to grasp the current signal states on the serial bus L to control the changeovers between the data bit lengths (i.e., the transmission modes) and the prohibition of transmission of data from a certain sensor module, while still maintaining the period of each data block.

A modification is provided as follows. In cases where each of the sensor modules 1 to 5 has digital data of a large value corresponding to a large load level, it is possible not to notify the occurrence of such data of the other sensor modules and the ECU 6. In this case, if a 4-bit-length bit pattern of "normal, 1, 1, 1, 1" corresponding to a maximum impact load value in the bit pattern, appears on the serial line L, both of the central airbag ECU 6 and the other sensor modules other than a sensor module "x" issuing the "normal (transmission)" in the 8-bit data transmission mode conclude that the sensor module "x" has outputted the digital data of a large amount. That is, it can be assumed that the sensor module "x" are going to output its 8-bit digital data at the next transmission timing, so that the other modules and ECU can take necessary steps.

Third Embodiment

A third embodiment of the present invention will now be described.

The third embodiment concerns with a configuration in which, in the normal state with no collisions, the length of data bit is fixed at 8 bits, but, in an emergency case such as a collision, a specific sensor module outputting digital data of a low load level or a predetermined sensor module is stopped from transmitting the data. This can shorten the cycles of data transmission in the emergency case.

In the present embodiment, since the data bit length is not changed at all, the sensor modules 1 to 5 are in operation for transmitting their block data at longer intervals under the normal condition with no collisions. If a collision occurs to change the bit pattern of digital data from a specific sensor module into the one showing a large value, the central airbag ECU 6 recognizes this pattern changes. The ECU 6 is thus able to command a predetermined sensor module to prohibit the transmission of its data.

Further, the communication control circuit 90 of each of the sensor modules 1 to 5 is able to recognize the patterns of data bits from the other senor modules, which appear on the serial bus L, and to easily recognize if the bit patterns have large amounts or not. This allows each communication control circuit 90 to decide whether or not the last two or more sets of digital data on the serial bus L show high values and its own digital data do no show a large value. Whenever this determination is affirmative, a sensor module "x" which has waited for the next transmission forcibly stops the data transmission. However, a sensor module "y" to be subjected to the next data transmission after the sensor module "x" is able to sense non-changes in the potential on the serial bus L, which are brought about by the temporal stop of the data transmission at the sensor module "x." Such non-changes appear as a longer unoccupied interval of time between two sets of digital data. Thus, in response to this detection of such a longer interval, the sensor module "y" is allowed to transmit its data.

There are still provided various modifications. For instance, another way of issuing a command for prohibiting the data transmission can be provided as follows. The central airbag ECU 6 uses the 8-bit digital data received from all the sensor modules 1 to 5 to issue and send, in a non-occupied period of time between data blocks, the command for prohibiting the next transmission from an appropriately selected sensor module or a predetermined sensor module. Alternatively, only a specific sensor module may be subjected to its frequent transmission of data.

In the above embodiments, the various types of control for the serial-bus type of transmission of data from the sensor modules 1 to 5 incorporated in the on-vehicle airbag activation system have been described. However, the present invention is not limited to such applications. It is obvious that the control according to the present invention is applicable to a variety of types of bus-connected sensor data transmission combined into other various systems.

In addition, the present invention may be embodied in other specific forms without departing from the spirit or essential characteristics of it. The present embodiments and modifications are therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. An apparatus for transmitting data in an airbag activation system mounted on a vehicle, the apparatus comprising:
   a communication channel having a predetermined transmission band for digital data;
   a plurality of sensor units mutually communicably connected via the communication channel, each sensor unit sensing a state of the vehicle,
      producing data indicative of the sensed state of the vehicle into a set of digital data including actually sensed data of a predetermined bit length, the actually sensed data corresponding to the sensed state of the vehicle, and
      outputting the set of digital data to the communication channel at predetermined transmission intervals, either the bit length of the actually sensed data or a frequency of transmission of the digital data being changed depending on the sensed state of the vehicle and the set of digital data being outputted successively from the sensor units; and
   a processing unit that successively receives the digital data from each sensor unit via the communication channel,
   wherein each of the sensor units is provided with a sensor sensing, as the state of the vehicle, an impact load to be applied to the vehicle and
   each of the sensor units is configured to produce information representing an increase in the bit length of the actually sensed data or an increase in the transmission frequency in cases where the sensed impact load has a large amplitude involving changes in predetermined high bits of the actually sensed data and information representing a decrease in the bit length of the actually sensed data or a decrease in the transmission frequency in cases where the sensed impact load has a small amplitude involving no changes in predetermined high bits of the actually sensed data.

2. The apparatus according to claim 1, wherein each sensor unit is configured to transmit a signal including information indicative of either the sensed state of the vehicle or the bit length to be changed of the digital data to be transmitted to the processing unit and
   the processing unit is configured to use the signal to determine either the sensed state of the vehicle or the bit length to be changed of the digital data, to decide a transmission state for the digital data to be received next, on the basis of a determined result, and to command that each sensor unit transmits the set of digital data based on the decided transmission state.

3. The apparatus according to claim 2, wherein the transmission state includes a mode on which each set of digital data is transmitted, the mode defining a format of each set of digital data, the format including data bits indicating the actually sensed state of the vehicle, and the data bits having either the predetermined bit length or half the predetermined bit length.

4. The apparatus according to claim 3, wherein the predetermined bit length is 8-bit length and half the predetermined bit length is 4-bit length.

5. The apparatus according to claim 3, wherein the processing unit is configured to additionally command that each sensor unit is allowed or not allowed to transmit the set of digital data.

6. An apparatus for transmitting data in an airbag activation system mounted on a vehicle, the apparatus comprising:
   a communication channel having a predetermined transmission band for digital data;
   a plurality of sensor units mutually communicably connected via the communication channel, each sensor unit sensing a state of the vehicle,
      producing data indicative of the sensed state of the vehicle into a set of digital data including actually sensed data of a predetermined bit length, the actually sensed data corresponding to the sensed state of the vehicle, and
      outputting the set of digital data to the communication channel at predetermined transmission intervals, either the bit length of the actually sensed data or a frequency of transmission of the digital data being changed depending on the sensed state of the vehicle and the set of digital data being outputted successively from the sensor units; and
   a processing unit successively receiving the digital data from each sensor unit via the communication channel,
   wherein each of the sensor units is configured to produce information representing an increase in the bit length of the actually sensed data or an increase in the transmission frequency in cases where the sensed impact load has a large amplitude involving changes in predetermined high bits of the actually sensed data and information representing a decrease in the bit length of the actually sensed data or a decrease in the transmission frequency in cases where the sensed impact load has a small amplitude involving no changes in predetermined high bits of the actually sensed data.

7. The apparatus according to claim 6, wherein each sensor unit is configured to transmit a signal including information indicative of either the sensed state of the vehicle or the bit length to be changed of the digital data to be transmitted to the processing unit and
   the processing unit is configured to use the signal to determine either the sensed state of the vehicle or the bit length to be changed of the digital data, to decide a transmission state for the digital data to be received next, on the basis of a determined result, and to command that each sensor unit transmits the set of digital data based on the decided transmission state.

8. The apparatus according to claim 7, wherein the transmission state includes a mode on which each set of digital data is transmitted, the mode defining a format of each set of digital data, the format including data bits indicating the actually sensed state of the vehicle, and the data bits having either the predetermined bit length or half the predetermined bit length.

9. The apparatus according to claim 8, wherein the predetermined bit length is 8-bit length and half the predetermined bit length is 4-bit length.

10. The apparatus according to claim 8, wherein the processing unit is configured to additionally command that each sensor unit is allowed or not allowed to transmit the set of digital data.

11. An apparatus for transmitting data in an airbag activation system mounted on a vehicle, the apparatus comprising:

a communication channel having a predetermined transmission band for digital data;

a plurality of sensor units mutually communicably connected via the communication channel, each sensor unit sensing a state of the vehicle, producing data indicative of the sensed state of the vehicle into a set of digital data including actually sensed data of a predetermined bit length, the actually sensed data corresponding to the sensed state of the vehicle, and outputting the set of digital data to the communication channel at predetermined transmission intervals, either the bit length of the actually sensed data or a frequency of transmission of the digital data being changed depending on the sensed state of the vehicle and the set of digital data being outputted successively from the sensor units; and a processing unit successively receiving the digital data from each sensor unit via the communication channel, wherein each sensor unit is configured to transmit a signal including information indicative of either the sensed state of the vehicle or the bit length to be changed of the digital data to be transmitted to the processing unit, the processing unit is configured to use the signal to determine either the sensed state of the vehicle or the bit length to be changed of the digital data, to decide a transmission state for the digital data to be received next, on the basis of a determined result, and to command that each sensor unit transmits the set of digital data based on the decided transmission state, and the transmission state includes a mode on which each set of digital data is transmitted, the mode defining a format of each set of digital data, the format including data bits indicating the actually sensed state of the vehicle, and the data bits having either the predetermined bit length or half the predetermined bit length.

12. The apparatus according to claim 11, wherein the predetermined bit length is 8-bit length and half the predetermined bit length is 4-bit length.

13. The apparatus according to claim 11, wherein the processing unit is configured to additionally command that each sensor unit is allowed or not allowed to transmit the set of digital data.

14. An apparatus for transmitting data in an airbag activation system mounted on a vehicle, the apparatus comprising:

a communication channel having a predetermined transmission band for digital data;

a plurality of sensor units mutually communicably connected via the communication channel, each sensor unit sensing a state of the vehicle, producing data indicative of the sensed state of the vehicle into a set of digital data including actually sensed data of a predetermined bit length, the actually sensed data corresponding to the sensed state of the vehicle, and outputting the set of digital data to the communication channel at predetermined transmission intervals, either the bit length of the actually sensed data or a frequency of transmission of the digital data being changed depending on the sensed state of the vehicle and the set of digital data being outputted successively from the sensor units; and a processing unit that successively receives the digital data from each sensor unit via the communication channel, wherein each of the sensor units is provided with a sensor sensing, as the state of the vehicle, an impact load to be applied to the vehicle and each of the sensor units is configured to produce information representing a high value of the bit length of the actually sensed data or a high value of the transmission frequency in cases where the sensed impact load has a large amplitude involving changes in predetermined high bits of the actually sensed data and information representing a low value of the bit length of the actually sensed data or a low value of the transmission frequency in cases where the sensed impact load has a small amplitude involving no changes in predetermined high bits of the actually sensed data.

15. The apparatus according to claim 14, wherein the bit length of the actually sensed data is either an 8-bit length or a 4-bit length, the increase in the bit length corresponding to a change from the 8-bit length to the 4-bit length and the decrease in the bit length corresponding to a change from the 4-bit length to the 8-bit length.

16. The apparatus according to claim 1, wherein the bit length of the actually sensed data is either an 8-bit length or a 4-bit length, the increase in the bit length corresponding to a change from the 8-bit length to the 4-bit length and the decrease in the bit length corresponding to a change from the 4-bit length to the 8-bit length.

17. The apparatus according to claim 16, wherein each sensor unit includes an A/D (analog to digital) converter converting data indicative of the sensed state of the vehicle to the set of digital data of the predetermined bit length.

18. The apparatus according to claim 17, wherein the high bits of the actually sensed data is upper half bits of the predetermined bit length of the A/D converter.

19. The apparatus according to claim 18, wherein the high bits of the actually sensed data is upper 4 bits of 8-bit data on which the actually sensed data are formatted by the A/D converter.

* * * * *

UNITED STATES PATENT AND TRADEMARK OFFICE
CERTIFICATE OF CORRECTION

PATENT NO. : 7,610,135 B2                                 Page 1 of 1
APPLICATION NO. : 11/064103
DATED           : October 27, 2009
INVENTOR(S)     : Miura et al.

It is certified that error appears in the above-identified patent and that said Letters Patent is hereby corrected as shown below:

IN THE CLAIMS:

Col. 16, claim 15, line 29, change "increase" to --decrease--; and
    claim 15, line 31, change "decrease" to --increase--.

Col. 16, claim 16, line 35, change "increase" to --decrease--; and
    claim 16, line 37, change "decrease" to --increase--.

Signed and Sealed this

Fourth Day of May, 2010

David J. Kappos
*Director of the United States Patent and Trademark Office*